R. A. Filkins,
Stop Cock,
N° 80,160. Patented July 21, 1868.

Witnesses;
Wm. A. Morgan
G. E. Cotton

Inventor:
R. A. Filkins
per Munn
Attorneys

UNITED STATES PATENT OFFICE.

R. A. FILKINS, OF NORTH ADAMS, MASSACHUSETTS.

IMPROVEMENT IN STEAM-ENGINE GLOBE-VALVES.

Specification forming part of Letters Patent No. 80,160, dated July 21, 1868.

*To all whom it may concern:*

Be it known that I, R. A. FILKINS, of North Adams, in the county of Berkshire and State of Massachusetts, have invented a new and useful Improvement in Steam-Valves; and I do hereby declare that the following is a full, clear, and exact description thereof, which will enable others skilled in the art to make and use the same, reference being had to the accompanying drawings, forming part of this specification, in which—

Figure 1:
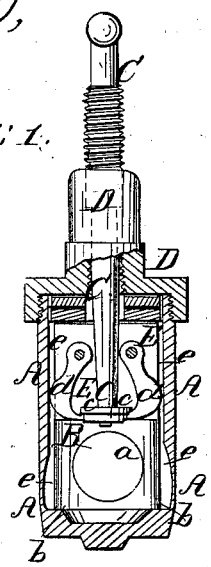
Figure 2:
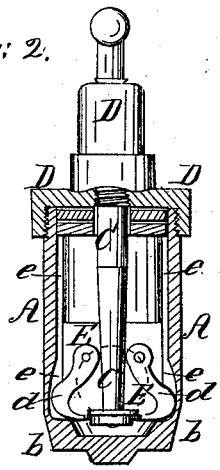
Figure 3:
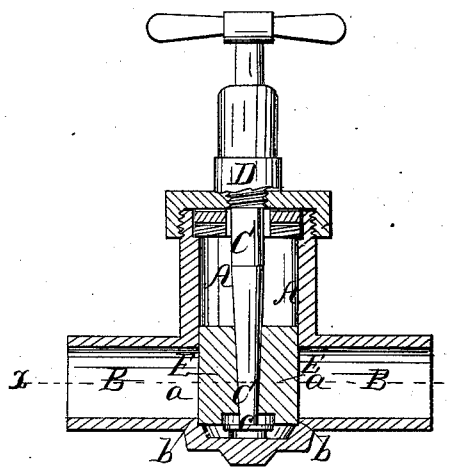
Figure 4:
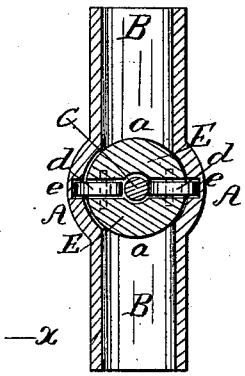

Figures 1 and 2 are side elevations, partly in section, of my improved steam-valve. Fig. 3 is a vertical longitudinal section of the same. Fig. 4 is a horizontal section of the same, taken on the line $x\,x$ of Fig. 3.

Similar letters of reference indicate corresponding parts.

This invention relates to a new steam-valve, which is so arranged that it can be worked up and down with perfect ease, while it closes the parts perfectly steam and air tight.

The invention consists of a plug or valve, which is made of two sections fitted around a tapering stem that is smallest at its lower end, and of two fingers pivoted between the sections. The fingers catch under a shoulder of the stem, but when the valve is on its seat they release the stem and allow it to be forced down between the sections so as to spread them laterally apart. The port-holes will thus be more effectually closed.

A, in the drawings, represents the tube in which the valve is arranged. This tube rises from and interrupts a tube, B, as in Fig. 3, there being two openings $a\,a$ thus formed where the tubes connect. The annular seat $b$ is formed under the tube A.

C represents the valve-stem. The same screws through the cover B of the tube A, and its lower part is of inverted conical form, having a projecting head, $c$, at the lowermost end.

The valve E is of cylindrical form, and is cut in two semi-cylindrical shells or pieces, as shown, which fit both around the conical part of the stem. Between the pieces of the valve are pivoted on opposite sides of the stem two L-shaped fingers $d\,d$, as shown, which project with their back edges beyond the periphery of the valve or plug. For the reception of these projecting fingers there are grooves $e\,e$ fitted into the inside of the tube A, as in Figs. 1, 2, and 4. By means of these grooves and fingers the plug E is prevented from turning, it resting on the head $c$, as shown, working up and down with the stem.

The lower ends of the grooves $e$ are enlarged, as in Figs. 1 and 2. When the plug is elevated to keep the passage in B open, as in Fig. 1, the fingers will, with their ends, fit under the head $c$, and will lock the plug to the stem and the stem to the plug; but when the plug has reached its seat, the fingers fit into the enlarged portions of the grooves and liberate the stem, as in Fig. 2, so that now the stem can be moved down between the sections of the plug to force them tight against the sides of the tube A. The parts $a\,a$ will then be closed perfectly air-tight, as by means of the conical shape of the stem any required degree of lateral motion can be imparted to the sections of the plug.

That portion of the stem which is surrounded by the plug may be either smooth, as shown, or may have a screw-thread.

Having thus described my invention, I claim as new, and desire to secure by Letters Patent—

1. A sectional valve, E, fitted around a stem, $c$, and provided with pivoted fingers $d\,d$, substantially as herein shown and described, all made and operating as specified.

2. The valve E, when made in sections, as described, and when provided with swinging fingers $d$, which work in grooves $e\,e$, in combination with the conical reciprocating stem C, carrying the head $c$, all made and operating substantially as herein shown and described.

R. A. FILKINS.

Witnesses:
A. W. PRESTON,
WM. A. RICE.